United States Patent [19]

Campen et al.

[11] Patent Number: 5,565,107
[45] Date of Patent: Oct. 15, 1996

[54] PROCESS AND APPARATUS FOR PURIFYING STREAMS

[75] Inventors: Jan P. Campen, Wassenaar; Blandikus C. Jaspers, Delft; Joannes P. Kaptijn, Oegstgeest, all of Netherlands

[73] Assignee: ECO Purification Systems, B.V., Netherlands

[21] Appl. No.: 338,491

[22] PCT Filed: Jun. 4, 1993

[86] PCT No.: PCT/NL93/00119

§ 371 Date: Nov. 17, 1994

§ 102(e) Date: Nov. 17, 1994

[87] PCT Pub. No.: WO93/25481

PCT Pub. Date: Dec. 23, 1993

[30] Foreign Application Priority Data

Jun. 4, 1992 [NL] Netherlands ............................ 9200989

[51] Int. Cl.⁶ ..................................................... C02F 1/46
[52] U.S. Cl. ........................ 205/688; 210/757; 210/760; 210/748; 205/753; 205/754; 205/756; 205/760
[58] Field of Search ..................................... 204/130, 131, 204/149, 275, 277, 278; 210/663, 694, 748, 757, 760, 243, 266, 199, 205, 218, 220

[56] References Cited

U.S. PATENT DOCUMENTS

| | | | |
|---|---|---|---|
| 3,730,885 | 5/1973 | Makrides et al. | 204/149 |
| 3,915,822 | 10/1975 | Veltman | 204/149 |
| 4,013,554 | 3/1977 | Reis et al. | 204/149 |
| 4,130,483 | 12/1978 | Waltrip | 210/663 |
| 4,131,526 | 12/1978 | Moeglich | 204/149 |
| 4,159,309 | 6/1979 | Faul et al. | 210/757 |
| 4,260,484 | 4/1981 | Connolly | 204/149 |
| 4,351,734 | 9/1982 | Kauffman | 210/760 |
| 4,954,469 | 9/1990 | Robinson | 210/694 |
| 4,983,267 | 1/1991 | Moeglich et al. | 204/149 |

Primary Examiner—Peter A. Hruskoci
Assistant Examiner—Theodore M. Green
Attorney, Agent, or Firm—Donald C. Casey

[57] ABSTRACT

A process for purifying streams which contain organic and/or inorganic impurities is disclosed. The stream to be treated is introduced into a water-containing reaction zone which includes a packed bed of activated carbon to which an electrochemical potential is applied and to which ozone or hydrogen is fed at the same time. The cell further uses a contact electrode placed in the packed bed for supplying or removing an electrical current, and a counterelectrode disposed in a reaction vessel. The counterelectrode is electrically insulated from the packed bed of activated carbon. The cell further includes an inlet for feeding in liquid to be treated, an inlet for feeding ozone or hydrogen gas, and an outlet for discharging treated liquid and a further outlet for discharging waste gas.

12 Claims, 1 Drawing Sheet

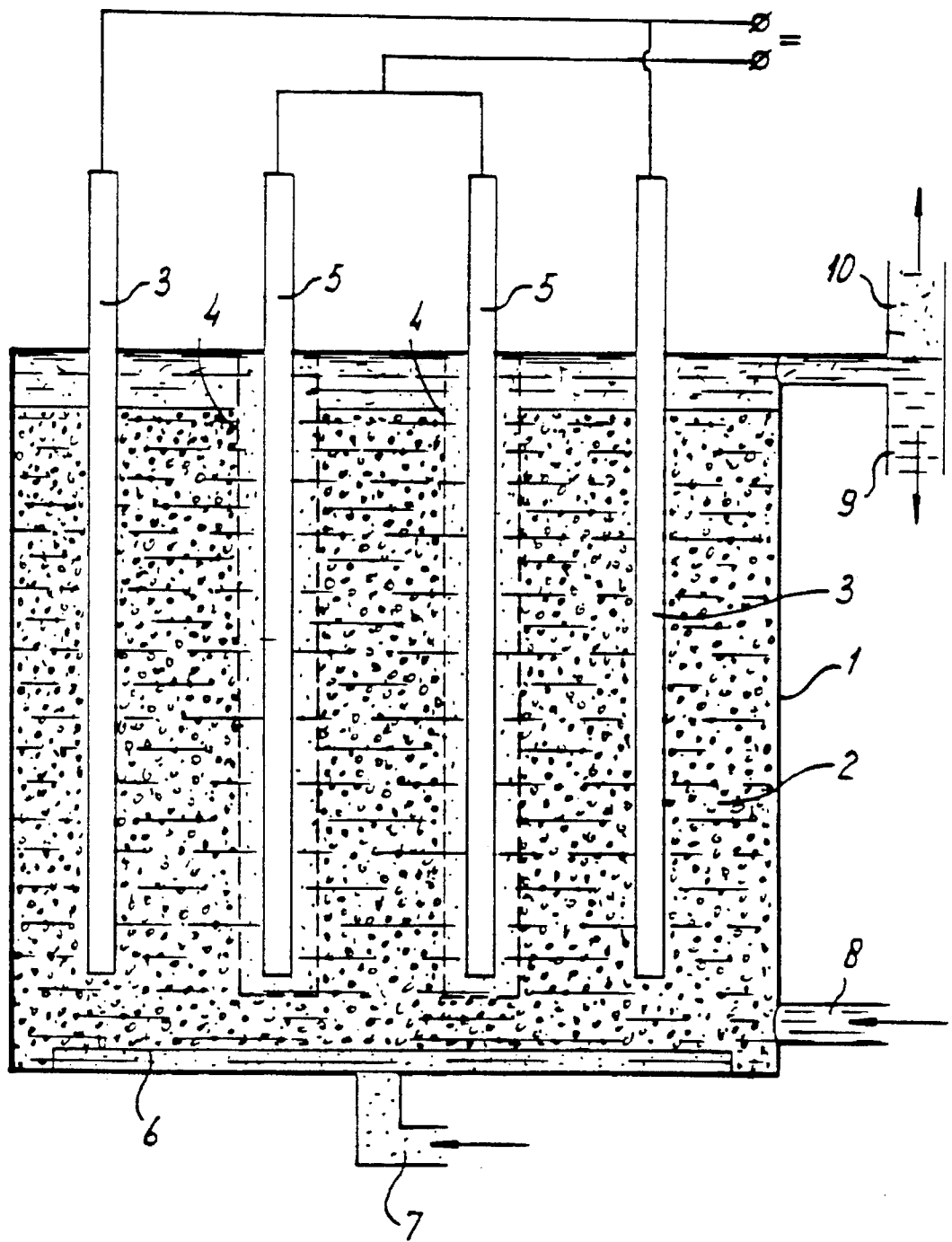

PROCESS AND APPARATUS FOR PURIFYING STREAMS

The invention relates to a process for purifying streams which contain organic and/or inorganic impurities, the stream to be treated being introduced into a water-containing reaction zone, and to an apparatus which can be used for this process.

International Patent Application PCT/NL90/00075 (publication number WO 90/14312) discloses a process for the treatment of water which is contaminated with unwanted constituents such as (aromatic) hydrocarbons and pesticides, by treating the contaminated water or the gaseous and/or liquid components present therein or originating therefrom with ozone and a catalyst such as activated carbon, the catalyst being regenerated continuously with ozone. This process, however, has the drawback that the ozone consumption for the purpose of decomposition of the impurities (expressed as COD=chemical oxygen demand), in spite of the relatively low values, is still too high for many applications and the residence time in the reactor is rather long.

Dutch Patent Application 9000118 discloses a method for purifying streams which contain organic and/or inorganic impurities, in which the stream to be treated is introduced into a water-containing reaction zone to which current is supplied via one or more electrodes while a substance is supplied at the same time which, under the influence of the electric current supplied, produces radicals which react with the impurities. The examples given of substances of this type comprise methane, carbon monoxide, hydrogen, ammonia, oxygen, ozone and hydrogen peroxide. The substance producing electrochemical radicals in the process is preferably fed to the reaction zone via a porous electrode. The residence time in the reaction zone can be shortened by employing elevated temperatures, preferably in the range from 10° to 95° C. The degree of conversion and the electric energy consumption in this known method still leaves something to be desired.

A process and apparatus for electrochemical reactions to be used for pollution control are known from U.S. Pat. No. 3,915,822. An electrochemical cell is used wherein an electrolyte—which contains impurities or undesirable components—is treated in a reaction zone containing electrically conductive particles, e.g. carbon pellets, as well as a plurality of electrodes. The conductive particles may consist of activated carbon in granular, spherical or other form. The voltage is normally a DC potential gradient in the order of 0.1 to 10 Volts/cm. During the process of this U.S. patent a gas reactant such as $O_3$ or $Cl_2$ may be used. It is indicated that a mixture of $O_3$ in a diluent gas can be introduced to the liquid filled bed of electrically conductive particles as fine bubbles containing ozone in an amount of 2–20 vol. %. The use of a sub-stoichiometric amount of ozone or any other reactant is not suggested.

The object of the present invention is to overcome the above-mentioned drawbacks regarding energy consumption and expensive starting materials.

To this end, the invention provides a process for purifying streams which contain undesirable organic and/or inorganic impurities which impurities may be converted into harmless compounds by reduction or oxidation, the stream to be treated being introduced into a water-containing reaction zone which comprises a packed bed of activated carbon to which an electrochemical potential is applied and to which ozone or hydrogen is fed at the same time.

The degree of polution for oxidisable impurities can be quantified as Cemical Oxygen Demand (COD). This relates to the standard USEPA method of analysis which determines the amount of oxygen that would be needed for a near complete oxidation of the micro pollutants. Evidently, in ozonation processes the resulting reaction products are also formed by introduction of oxygen into the molecules of the micro pollutants. Obeying the law of mass conservation one would expect to find an equal mass of ozone consumed as the mass of COD reduced if all oxygen atoms of the ozone molecule would have been effectively used. Sub-stoechiometry in ozone is present if lower values than 1 kg $O_3$/kg COD are found.

Analogous to the COD a theoretical Chemical Hydrogen Demand (CHD) can be defined (for reducible impurities), i.e. the amount of hydrogen necessary for a complete reduction with hydrogen of the micro pollutants present in the waste water. For instance, the nitrate reduction using a Pd/Cu catalyst (Th. Tacke et al., Dechema-Monographie Katalyse, 122, 15–27, Frankfurt/M 1991) gives the reaction: $2NO^-_3 + 5H_2 \rightarrow N_2 + 4H_2O + 2OH^-$ at elevated pressure. Using both the molar weights of the nitrate and the hydrogen for e.g. a 100 mg nitrate per liter solution the CHD amounts 8.06 mg $H_2$/l. Similarly sub-stoechiometry in hydrogen arises when a lower hydrogen consumption is found than 1 kg $H_2$/kg CHD.

Surprisingly the process according to the invention gives rise to a lower ozone consumption than mentioned above, that is sub-stoechiometric of less than 1 kilogram of ozone per kilogram of COD reduced. The same is valid for the hydrogen consumption and CHD degradation. Consequently, the process according to the invention is characterised in that a reactant selected from ozone and hydrogen is, at the same time, fed into the reaction zone in a sub-stoechiometric amount.

The residence time in the reactor is low, i.e. considerably more advantageous than the effects according to WO 90/14312 and NL 9000118. It is a matter of a synergistic effect, as said effects are more favourable than the sum of the effects obtained in using the process according to said two literature references. This has been shown on the basis of experiments which will be described hereinafter.

In the process according to the invention, a reaction zone is preferably used in which the packed bed of activated carbon consists of particles having a surface of at least 50 $m^2$/g, preferably 200–1200 $m^2$/g and a pore volume of at least 0.05 $cm^3$/g, preferably 0.1–0.3 $cm^3$/g.

In general, an embodiment is used according to the invention in which the electrochemical potential of the packed bed is less than 10 volts with respect to an Hg/$HgSO_4$ reference electrode and preferably is in the range of 0.1–4 volts. In particular, the value of the electrochemical potential is less than the voltage required for the electrolysis of water, i.e. the quantitative electrolysis of water using the cell configuration in question.

The potential at which water electrolysis occurs depends on the electrode material and is therefore always different for each reactor. Carbon electrodes have a relatively high overpotential for the generation of hydrogen. Furthermore, if the electrode material is contaminated, it is possible for water electrolysis to occur to a slight extent even at lower potentials. Many opposing reactions exist, but the K and Na ions which are present, for example, will not be deposited as a metal on the counterelectrode but give rise to generation of hydrogen and formation of $OH^-$. The deposition of heavy metals, on the other hand, is possible.

The consumption of electrical charge is lower than expected. In case of conventional Faradayan electrochemical oxidation one would expect that for each oxygen atom introduced in the micro pollutant molecule two electrons would be needed. The number of oxygen atoms introduced is again directly dependent on the lowering of COD content of the effluent. In general the theoretical specific electric consumption equals: (n*F)/(3600*M) in kAh/kg reduced (or n*F Coulombs per mole), with n the number of electrons involved, F the Faraday constant and M the molar weight of the micro pollutant, oxygen in case of COD or hydrogen in case of CHD. So, if per kilogram of COD reduced, less thans 3.35 kAh is introduced sub=stoechiometry in electrical charge is present. Substantially lower electrical currents are necessary than theoretically expected based on the conversions as mentioned in the table hereafter. A similar reasoning applies for the CHD. This results in an amount of charge of less than 26.8 kAh/kg CHD. Consequently, it is preferred in the process of the invention that the used amount of charge is less than 3.35 kAh/kg COD in case of oxidation with $O_3$ or less than 26.8 kAh/kg CHD in case of reduction with $H_2$.

In the process according to the invention, the ozone or hydrogen consumption is surprisingly low. In an embodiment of the invention ozone is used in an amount of 0.001–0.5 kg $O_3$/kg COD of the impurities to be removed, preferably 0.005–0.3 kg $O_3$/kg COD and/or in which hydrogen is used in an amount of 0.001–0.5 kg $H_2$/kg CHD of the impurities to be removed, preferably 0.005–0.3 kg $H_2$/kg CHD.

The process according to the invention therefore involves a substoichiometric ozone consumption. This indicates that the process according to the invention is based on a totally different mechanism compared to conventional oxidations with ozone. Thanks to this special mechanism, the process according to the invention is also suitable for the oxidation substances which cannot readily be decomposed, such as chlorinated hydrocarbons, for example freons. In the latter case carbonates, chlorides and/or fluorides are produced. Ammonia can be decomposed to give the harmless nitrogen gas.

Using the process according to the invention, it is possible to employ, apart from the oxidations with ozone, reduction reactions with hydrogen to good effect. Thus it is possible, for example, to convert nitrate dissolved in water into nitrogen gas, if hydrogen gas is fed in in the process according to the invention.

Employing a higher temperature than room temperature in general produces a further improvement of the above-mentioned effects. Therefore, the process according to the invention preferably employs a temperature in the reaction zone of at least 20° C., preferably 30°–80° C. This is remarkable because, in the case of the conventional decomposition processes using ozone, there is the effect of the considerably reduced solubility of ozone gas in water at elevated temperature. In the conventional processes, therefore, an elevated pressure is used preferably (in order to accelerate the decomposition processes), which has the effect of increasing the cost of the installation. In the process according to the invention, the use of elevated pressure is unnecessary or necessary only to a small degree.

The invention also relates to an apparatus suitable for carrying out the process described above. This apparatus comprises at least a reaction vessel containing a packed bed of activated carbon which can be operated as an electrode, a contact electrode placed in the packed bed, for the supply or removal of an electric current, a counterelectrode disposed in the reaction vessel, means for electronically insulating the packed bed of activated carbon and the counterelectrode, means for feeding in liquid, means for discharging liquid, means for feeding in ozone-containing gas, means for discharging waste gas. Said means for electronic insulation may be perforated tubes or semipermeable membranes.

In the apparatus according to the invention, the electrodes are preferably arranged so as to be detachable, so that any deposits, for example of metals, can be removed therefrom.

An embodiment of the apparatus according to the invention is depicted in the FIGURE. The symbols in this FIGURE have the following meaning:

1 reaction vessel,
2 packed bed of activated carbon,
3 contact electrode placed in the packed bed,
4 perforated electrode screen for electronically, insulating the packed bed of activated carbon and the counterelectrode,
5 counterelectrode,
6 diffusor for gas input (which ensures a good distribution of the feed gas over the entire bed of activated carbon),
7 inlet for ozone- or hydrogen-containing gas,
8 inlet for (contaminated) liquid.
9 discharge for treated liquid,
10 discharge for waste gas.

The invention is explained on the basis of experiments.

These experiments made use of a glass reactor. This is provided with a gas diffuser at the bottom and a perforated PVC inner tube in the centre. In this tube, a graphite counterelectrode is positioned, and around the tube there is a bed of activated carbon. In addition, a graphite tube is placed in the bed as a current collector. The following data are of interest:

| Reactor: | |
| --- | --- |
| length = | 1 meter |
| internal diameter = | 5 cm |
| liquid flow rate = | 16–20 ml/min |
| gas flow rate = | 200–300 ml/min |
| liquid volume = | 400 ml |

| Activated carbon: | |
| --- | --- |
| bulk density = | 380 g/l |
| grain diameter = | 0.8 mm |
| total pore volume = | 1.0 $cm^3$/g |
| specific surface = | 1000–1200 $m^2$/g |
| iodine adsorption = | 1050 mg/g |
| weight = | 700 g |

| Counterelectrode: | |
| --- | --- |
| material = | carbon |
| length = | 1.2 meters |
| diameter = | 1.0 cm |

| Perforated tube: | |
| --- | --- |
| Material = | PVC |
| length = | 1.2 meter |
| diameter = | 1.3 cm |

| Potentiostat/reference: | |
| --- | --- |
| trademark = | Bank |
| type = | HP-88 |
| reference electrode = | Hg/$HgSO_4$ via Luggin capillary at liquid inlet |
| current = | 0.085–0.200 A |
| Current density = | 2.6–6.1 · $10^{-4}$ A/$cm^2$ max (decreasing in the radial direction) |

The results of the tests are summarised in Table A.

TABLE A

| Waste water type* | Residence time [minutes] | Ozone consumption [gO₃/gCOD] | Voltage vs. ref. [volts] | Sp. Electr. Consumption [kAh/kgCOD] | Electr. Consumption [kWh/kgCOD] | COD$_{IN}$ [mg/l] | COD$_{OUT}$ [mg/l] | Conversion % |
|---|---|---|---|---|---|---|---|---|
| A | 20 | 0.25 | 2.50 | 0.023 | 0.09 | 4300 | 1100 | 74 |
|   | 25 | 0.30 | 2.50 | 0.026 | 0.10 | 4300 | 883 | 79 |
| B | 24 | 0.024 | 2.50 | 0.0033 | 0.013 | 71000 | 12400 | 83 |
|   | 24 | 0.048 | 2.50 | 0.0029 | 0.011 | 71000 | 20000 | 72 |

*) waste water type A contains, inter alia: petroleum sulphonates, oleic acids and carbonates.
*) waste water type B contains, inter alia: epichlorophydrin derivatives, allyl chloride derivatives and chloride ions.

Using a comparable treatment according to the process of WO 90/14312, results are achieved which are summarised in Table B.

TABLE B

| Waste water type | Residence time [minutes] | Ozone consumption [gO₃/gCOD] | Voltage vs. ref. [volts] | Electr. Consumption [kWh/kg COD] | COD$_{IN}$ [mg/l] | COD$_{OUT}$ [mg/l] | Conversion % |
|---|---|---|---|---|---|---|---|
| A | 58 | 5.6 | 0 | 0 | 3700* | 3255 | 12 |
|   | 58 | 2.5 | 0 | 0 | 3700* | 2935 | 21 |
| B | 81 | 3.9 | 0 | 0 | 54260 | 16881 | 69 |
|   | 133 | 5.3 | 0 | 0 | 54260 | 13310 | 75 | failed to accomplish higher conversions

*Type A shows fluctuations because of the varying composition and pH of the incoming liquid.

This conventional process fails because of a still excessive COD value and in absolute terms it consumes an extraordinarily large amount of ozone, given the high COD contents.

Using a comparable treatment according to the process of NL 9000118, results are achieved which are summarised in Table C.

TABLE C

| Waste water type | Residence time [minutes] | Ozone consumption [gO₃/gCOD] | Voltage vs. ref. [volts] | Electr. Consumption [kWh/kg COD] | COD$_{IN}$ [mg/l] | COD$_{OUT}$ [mg/l] | Conversion % |
|---|---|---|---|---|---|---|---|
| A | 120 | 0 |   | — |   | 7580 | 0 |
| B | 60 | 0 | 1.8 | 0.19 | 61000 | 35000 | 43 |
|   | 120 | 0 | 1.8 | 0.42 | 61000 | 36000 | 41 | failed to accomplish higher conversions

Again the degradation of COD comes to a standstill at high COD levels so no higher conversion were possible using this system.

The process according to the invention is also applied for reduction of nitrate in water. The results are stated in table D.

TABEL D

| Residence time [minutes] | Hydrogen consumption [gH₂/gCHD] | Voltage vs. ref. [volts] | Sp. Electr. consumption [kAh/kg CHD] | Electr. consumption [kWh/kg CHD] | cNO$_3^-$ In [mg/l] | cNO$_3^-$ out [mg/l] | Conversion % |
|---|---|---|---|---|---|---|---|
| 84 | 0.59 | 4 | 4.44 | 20.0 | 886 | 257 | 71 |
| 84 | 0.66 | 4 | 5.03 | 22.6 | 886 | 319 | 64 |

Both the hydrogen consumption and the consumption of electrical charge are less than the expected stoechiometric amounts of 1 g H₂/g CHD and 26.8 kAh/kg CHD.

We claim:

1. Process for purifying a stream which contains organic and/or inorganic impurities, the stream to be treated being introduced into a water-containing reaction zone which comprises providing a packed bed of activated carbon, applying an electrochemical potential across said packed bed and simultaneously feeding a reactant selected from the group consisting of ozone and hydrogen to said packed bed, said reactant being supplied to said bed in a sub-stoichiometric amount, which is about 0.5 kg O₃/kg COD or less in the case of ozone and about 0.66 kg H₂/kg CHD or less in the case of hydrogen, and the charge consumed in the potential applied across said bed being substantially less than 3.35 kAh/kg COD in the case of oxidation with O₃ or 26.8 kAh/kg CHD in the case of reduction with H₂ so that the total of the charge consumed and reactant used is substantially less than that theoretically required for removal of said impurities.

2. Process according to claim 1, in which the packed bed of activated carbon consists of particles having a surface of at least 50 $m^2/g$ and a pore volume of at least 0.05 $cm^3/g$.

3. The process of claim 2 wherein the activated carbon particles have a surface of from 200–1200 $m^2/g$ and a pore volume of 0.1–0.3 $cm^3/g$.

4. Process according to claim 1, in which the electrochemical potential of the packed bed is less than 10 volts with respect to an $Hg/HgSO_4$ reference electrode.

5. Process according to claim 4 wherein the electrochemical potential across the packed bed is less than that required for the electrolysis of water in said bed.

6. The process of claim 4 wherein the potential of the packed bed is 0.1–4 volts.

7. Process according to claim 1, in which ozone is used in an amount of 0.001–0.5 kg $O_3$/kg COD of the impurities to be removed.

8. The process of claim 7 wherein the amount of ozone used is 0.005–0.3 kg $O_3$/kg COD.

9. Process according to claim 1, in which a temperature is employed in the reaction zone of at least 20° C.

10. The process of claim 9 wherein the temperature employed is 30°–80° C.

11. Process according to claim 1 in which hydrogen is used in an amount of 0.001–0.5 kg $H_2$/kg CHD.

12. The process of claim 11 where the amount of hydrogen used is 0.005–0.3 kg $H_2$/kg CHD.

* * * * *